US009032730B2

(12) United States Patent
Kobayashi et al.

(10) Patent No.: US 9,032,730 B2
(45) Date of Patent: May 19, 2015

(54) SOLAR RECEIVING

(75) Inventors: Kazuta Kobayashi, Tokyo (JP); Masashi Tagawa, Tokyo (JP); Toshiyuki Osada, Tokyo (JP); Kuniaki Aoyama, Tokyo (JP); Masahiro Masuda, Tokyo (JP); Takeshi Okubo, Tokyo (JP); Shuhei Sasaki, Tokyo (JP); Akira Furutani, Tokyo (JP); Jin Kato, Tokyo (JP); Hiromi Nakatani, Tokyo (JP)

(73) Assignee: MITSUBISHI HEAVEY INDUSTRIES, LTD., Tokyo (JP)

( * ) Notice: Subject to any disclaimer, the term of this patent is extended or adjusted under 35 U.S.C. 154(b) by 596 days.

(21) Appl. No.: 13/302,005

(22) Filed: Nov. 22, 2011

(65) Prior Publication Data

US 2012/0180483 A1 Jul. 19, 2012

(30) Foreign Application Priority Data

Nov. 29, 2010 (JP) ................................ 2010-265676
Nov. 29, 2010 (JP) ................................ 2010-265679

(51) Int. Cl.
*F03G 6/00* (2006.01)
*F03G 7/00* (2006.01)
(Continued)

(52) U.S. Cl.
CPC .. *F03G 6/04* (2013.01); *F03G 6/06* (2013.01); *F24J 2/24* (2013.01); *F24J 2/46* (2013.01); *F24J 2/07* (2013.01); *Y02E 10/46* (2013.01); *Y02E 10/41* (2013.01)

(58) Field of Classification Search
CPC ....... F03G 6/06–6/068; F24J 2/07; F24J 2/10; F24J 2/16; F24J 2/24; F24J 2/245; Y02E 10/41
USPC ................... 60/641.8–641.15; 126/651–677, 126/684–695, 704–713
See application file for complete search history.

(56) References Cited

U.S. PATENT DOCUMENTS 3,924,604 A 12/1975 Anderson
4,164,123 A 8/1979 Smith
(Continued)

FOREIGN PATENT DOCUMENTS

FR 2490331 A1 3/1982
JP 50-122945 A 9/1975
(Continued)

OTHER PUBLICATIONS

International Search Report for PCT/JP2011/076074, dated Feb. 21, 2012.
(Continued)

*Primary Examiner* — Christopher Jetton
(74) *Attorney, Agent, or Firm* — Kanesaka, Berner & Partners

(57) ABSTRACT

A solar receiver is disposed on a top portion of a tower provided upright on the ground for heating a compressible working fluid by means of heat converted from sunlight collected by heliostats disposed on the ground, to raise the temperature of the compressible working fluid. The solar receiver has modules disposed back-to-back, and each of which includes a casing having a bottom plate to be fixed to the top-portion upper surface of the tower. A heat-transfer-tube unit is accommodated in the casing and includes heat transfer tubes. A sunlight inlet port having a circular shape in front view or an elliptical shape in front view is provided at the center portion of a plate-like member whose lower end is connected to an outer circumferential end of the bottom plate to constitute the casing and that extends obliquely upward from the outer circumferential end.

16 Claims, 9 Drawing Sheets

(51) Int. Cl.

| | |
|---|---|
| ***F24J 2/04*** | (2006.01) |
| ***F24J 2/10*** | (2006.01) |
| ***F03G 6/04*** | (2006.01) |
| ***F03G 6/06*** | (2006.01) |
| ***F24J 2/24*** | (2006.01) |
| ***F24J 2/46*** | (2006.01) |
| ***F24J 2/07*** | (2006.01) |

(56) References Cited

U.S. PATENT DOCUMENTS

| | | | | |
|---|---|---|---|---|
| 4,373,512 | A * | 2/1983 | Hirt | 126/570 |
| 4,452,232 | A * | 6/1984 | David | 126/587 |
| 4,546,758 | A * | 10/1985 | Ebernard | 126/635 |
| 4,633,854 | A | 1/1987 | Mayrhofer | |
| 8,033,110 | B2 * | 10/2011 | Gilon et al. | 60/641.11 |
| 2009/0241939 | A1 | 10/2009 | Heap et al. | |
| 2010/0154781 | A1 | 6/2010 | Zhang et al. | |
| 2010/0242949 | A1 | 9/2010 | Kawashima | |

FOREIGN PATENT DOCUMENTS

| | | | |
|---|---|---|---|
| JP | 2009162210 | A | 7/2009 |
| JP | 2010144725 | A | 7/2010 |
| WO | 2009044623 | A1 | 4/2009 |
| WO | 2009105689 | A2 | 8/2009 |

OTHER PUBLICATIONS

Extended European Search Report issued on Jul. 16, 2013 corresponds to European patent application No. 11844043.7.

Notification of Acceptance issued Nov. 12, 2013, corresponds to South African patent application No. 2013/03135.

* cited by examiner

SOLAR RECEIVING

CROSS REFERENCE TO RELATED APPLICATIONS

This application claims benefit of Japanese Applications No. 2011-265676 and No. 2011-265679 filed in Japan on Nov. 29, 2010, the contents of which are hereby incorporated by their reference.

BACKGROUND OF THE INVENTION

1. Field of the Invention

The present invention relates to a solar receiver that heats a compressible working fluid to raise its temperature by means of heat converted from sunlight collected by heliostats.

2. Description of Related Art

There is a known solar receiver in the related art that is disposed at the top of a tower (for example, see FIG. 3 of Japanese Unexamined Patent Application, Publication No. 2010-144725).

The solar receiver disposed at the top of the tower is installed, for example, on four column supports 102 provided upright on a top surface (top-portion upper surface) 101 of a tower 100 along the vertical direction, as shown in FIG. 11.

Furthermore, as shown in FIG. 12, a solar receiver 103 includes a casing 104 having a substantially cylindrical shape in appearance and a plurality of (for example, 500) heat transfer tubes (pipes) 105 arrayed on the inner periphery (heat receiving surface) of the casing 104, along the vertical direction at (substantially) regular intervals (such that the distances (pitches) between the central axes extending along the longitudinal direction of adjacent heat transfer tubes 105 become (substantially) equal).

As shown in FIG. 12, a sunlight inlet port 106 having a circular shape when viewed from vertically below is provided on the bottom of the casing 104. Sunlight collected by heliostats (not shown) enters the interior of the casing 104 via the sunlight inlet port 106 and reaches the plurality of heat transfer tubes 105 arrayed on the inner periphery of the casing 104 at (substantially) regular intervals, thus heating a high-pressure compressible working fluid passing through the heat transfer tubes 105 to raise the temperature thereof.

Note that reference symbol G in FIG. 11 denotes the ground on which the tower 100 is provided upright.

However, the solar receiver 103, in which the sunlight inlet port 106 having a circular shape when viewed from vertically below is provided on the bottom of the casing 104, is installed on the column supports 102, shown in FIG. 11, as described above, and thus, in some instances, sunlight collected by the heliostats strikes the column supports 102 before reaching the sunlight inlet port 106. Thus, there is a problem in that it is necessary for the column supports 102 to be formed of an expensive material that has heat resistance and also has sufficient strength so as to be capable of supporting the heavy solar receiver 103 even if the column supports 102 are made thin, thus increasing the manufacturing cost thereof.

BRIEF SUMMARY OF THE INVENTION

The present invention has been made in view of such circumstances, and an object thereof is to provide a solar receiver capable of avoiding a situation in which column supports for supporting the solar receiver are disposed in the paths of sunlight from the heliostats to the sunlight inlet ports of the solar receiver and capable of achieving simplification of the supporting structure for supporting the solar receiver and a reduction in the manufacturing cost thereof.

In order to solve the above-described problem, the present invention employs the following solutions.

According to a first aspect, the present invention provides a solar receiver that is disposed at a top portion of a tower provided upright on the ground and that heats a compressible working fluid by means of heat converted from sunlight collected by heliostats disposed on the ground, to raise the temperature of the compressible working fluid, in which modules having the same shape are disposed back-to-back, each of the modules including a casing having a bottom plate to be fixed to a top-portion upper surface of the tower, and a heat-transfer-tube unit that is accommodated in the casing and that includes heat transfer tubes to which the heat is transferred; and a sunlight inlet port having a circular shape in front view or an elliptical shape in front view is provided at a center portion of a plate-like member whose lower end is connected to an outer circumferential end of the bottom plate to constitute the casing and that extends obliquely upward from the outer circumferential end.

According to the solar receiver of the first aspect of the present invention, since the bottom plate, constituting the casing, is directly fixed to the top-portion upper surface of the tower, column supports that were conventionally needed to install the solar receiver at the top portion of the tower are unnecessary.

Thus, it is possible to avoid a situation in which the column supports for supporting the solar receiver are disposed in the paths of sunlight from the heliostats to the sunlight inlet ports of the solar receiver and to achieve simplification of the supporting structure for supporting the solar receiver and a reduction in the manufacturing cost thereof.

Furthermore, since each sunlight inlet port is formed so as to have a circular shape in front view or an elliptical shape in front view, it is possible to minimize the amount of heat leaking from the interior of the casing to the exterior of the casing via the sunlight inlet port, to maintain the interior of the casing at a high temperature, and to efficiently heat the compressible working fluid flowing through the heat transfer tubes to raise the temperature thereof.

In the solar receiver according to the first aspect of the present invention, it is preferable that, when the heat-transfer-tube unit is viewed from above, the heat-transfer-tube unit be structured so as to be located on a line having the same curvature from the left end of the heat-transfer-tube unit to the right end thereof in the width direction such that a center portion thereof in the width direction comes close to a dorsal side and both ends thereof in the width direction come close to each other.

According to this solar receiver, since sunlight introduced from the sunlight inlet ports is efficiently incident on the heat transfer tubes, the energy conversion efficiency can be improved.

Furthermore, according to this solar receiver, since the size of the heat-transfer-tube unit in the width direction is reduced, it is possible to achieve a reduction in the size of the solar receiver and a reduction in the weight thereof.

In the solar receiver according to the first aspect of the present invention, it is preferable that, when the heat-transfer-tube unit is viewed from above, the heat-transfer-tube unit be structured so as to be located on a hyperbolic line from the left end of the heat-transfer-tube unit to the right end thereof in the width direction such that a center portion thereof in the width direction comes close to a dorsal side and both ends thereof in the width direction come close to each other.

According to this solar receiver, since sunlight introduced from the sunlight inlet ports is efficiently incident on the heat transfer tubes, the energy conversion efficiency can be improved.

Furthermore, according to this solar receiver, since the size of the heat-transfer-tube unit in the width direction is reduced, it is possible to achieve a reduction in the size of the solar receiver and a reduction in the weight thereof.

In the solar receiver according to the first aspect of the present invention, it is preferable that a space that accommodates a pipe for guiding, to a turbine, the compressible working fluid flowing out from the heat transfer tubes be provided between back faces of the modules.

According to this solar receiver, the interior of the space, formed between the back faces of the modules, functions as hot banking, and the pipe for guiding, to the turbine, the compressible working fluid flowing out from the heat transfer tubes is disposed so as to pass through this hot banking.

Thus, it is possible to maintain the compressible working fluid passing through the pipe at a high temperature or to further heat the compressible working fluid passing through the pipe to raise the temperature thereof; and to improve the energy conversion efficiency.

According to a second aspect, the present invention provides a solar receiver that is disposed at a top portion of a tower provided upright on the ground and that heats a compressible working fluid by means of heat converted from sunlight collected by heliostats disposed on the ground, to raise the temperature of the compressible working fluid, including: a casing having a bottom plate to be fixed to a top-portion upper surface of the tower; and a heat-transfer-tube unit that is accommodated in the casing and that includes heat transfer tubes to which the heat is transferred, in which a sunlight inlet port having a circular shape in front view or an elliptical shape in front view is provided at a center portion of a plate-like member whose lower end is connected to an outer circumferential end of the bottom plate to constitute the casing and that extends obliquely upward from the outer circumferential end.

According to the solar receiver of the second aspect of the present invention, since the bottom plate, constituting the casing, is directly fixed to the top-portion upper surface of the tower, column supports that were conventionally needed to install the solar receiver at the top portion of the tower are unnecessary.

Thus, it is possible to avoid a situation in which column supports for supporting the solar receiver are disposed in the paths of sunlight from the heliostats to the sunlight inlet ports of the solar receiver and to achieve simplification of the supporting structure for supporting the solar receiver and a reduction in the manufacturing cost thereof.

Furthermore, since each sunlight inlet port is formed so as to have a circular shape in front view or an elliptical shape in front view, it is possible to minimize the amount of heat leaking from the interior of the casing to the exterior of the casing via the sunlight inlet port, to maintain the interior of the casing at a high temperature, and to efficiently heat the compressible working fluid flowing through the heat transfer tubes to raise the temperature thereof.

In the solar receiver according to the second aspect of the present invention, it is preferable that a space that accommodates a pipe for guiding, to a turbine, the compressible working fluid flowing out from the heat transfer tubes be formed in a center portion of the casing extending along the vertical direction.

According to this solar receiver, the interior of the space, formed in the center portion of the casing extending along the vertical direction, functions as hot banking, and the pipe for guiding, to the turbine, the compressible working fluid flowing out from the heat transfer tubes is disposed so as to pass through this hot banking.

Thus, it is possible to maintain the compressible working fluid passing through the pipe at a high temperature or to further heat the compressible working fluid passing through the pipe to raise the temperature thereof; and to improve the energy conversion efficiency.

In the solar receiver according to the first aspect or the second aspect of the present invention, it is preferable to further include a lid member for covering an upper portion of the space.

According to this solar receiver, an opening formed at an upper portion of the space is covered up with the lid member.

Thus, it is possible to maintain the interior of the space at a higher temperature; to maintain the compressible working fluid passing through the pipe, accommodated in the space, at a higher temperature or to further heat the compressible working fluid passing through the pipe to raise the temperature thereof; and to further improve the energy conversion efficiency.

In the above-described solar receiver, it is further preferable that the lid member be provided with a vent hole that passes through the lid member in the plate thickness direction and an opening and closing plate that opens and closes the vent hole.

According to this solar receiver, when the vent hole is opened, heat in the space is released via the vent hole, thus reducing the temperature in the space. Furthermore, when the vent hole is closed, the opening formed above the space is completely covered, thus increasing the temperature in the space.

Thus, the temperature in the space can be maintained within a predetermined temperature range.

According to a third aspect, the present invention provides a solar gas turbine, including: a solar receiver according to the first aspect or the second aspect of the present invention; and heliostats disposed on the ground.

According to the solar gas turbine of the third aspect of the present invention, the solar receiver is provided, which is capable of avoiding a situation in which column supports for supporting the solar receiver are disposed in the paths of sunlight from the heliostats (not shown) to the sunlight inlet ports of the solar receiver and which is capable of achieving simplification of the supporting structure for supporting the solar receiver and a reduction in the manufacturing cost thereof; therefore, it is possible to achieve simplification of the supporting structure at the top portion of the tower and a reduction in the installation cost thereof.

Furthermore, the solar receiver is provided, which is capable of minimizing the amount of heat leaking from the interior of the casing to the exterior of the casing via each sunlight inlet port because the sunlight inlet port is formed so as to have a circular shape in front view or an elliptical shape in front view, which is capable of maintaining the interior of the casing at a high temperature, and which is capable of efficiently heating the compressible working fluid flowing through the heat transfer tubes to raise the temperature thereof; therefore, it is possible to improve the energy conversion efficiency and to improve the overall heat efficiency.

According to a fourth aspect, the present invention provides a solar-gas-turbine power generating device, including a solar gas turbine according to the third aspect of the present invention.

According to the solar-gas-turbine power generating device of the fourth aspect of the present invention, the solar receiver is provided, which is capable of avoiding a situation in which column supports for supporting the solar receiver are disposed in the paths of sunlight from the heliostats to the sunlight inlet ports of the solar receiver and which is capable of achieving simplification of the supporting structure for supporting the solar receiver and a reduction in the manufacturing cost thereof; therefore, it is possible to achieve simplification of the supporting structure at the top portion of the tower and a reduction in the installation cost thereof.

Furthermore, the solar receiver is provided, which is capable of minimizing the amount of heat leaking from the interior of the casing to the exterior of the casing via each sunlight inlet port because the sunlight inlet port is formed so as to have a circular shape in front view or an elliptical shape in front view, which is capable of maintaining the interior of the casing at a high temperature, and which is capable of efficiently heating the compressible working fluid flowing through the heat transfer tubes to raise the temperature thereof; therefore, it is possible to improve the energy conversion efficiency and to improve the power generation efficiency.

According to the solar receiver of the present invention, an advantage is provided in that it is possible to avoid a situation in which column supports for supporting the solar receiver are disposed in the paths of sunlight from the heliostats to the sunlight inlet ports of the solar receiver and to achieve simplification of the supporting structure for supporting the solar receiver and a reduction in the manufacturing cost thereof.

DETAILED DESCRIPTION OF THE INVENTION

First Embodiment

A solar receiver according to a first embodiment of the present invention will be described below with reference to FIGS. 1 to 5.

Figure 1:
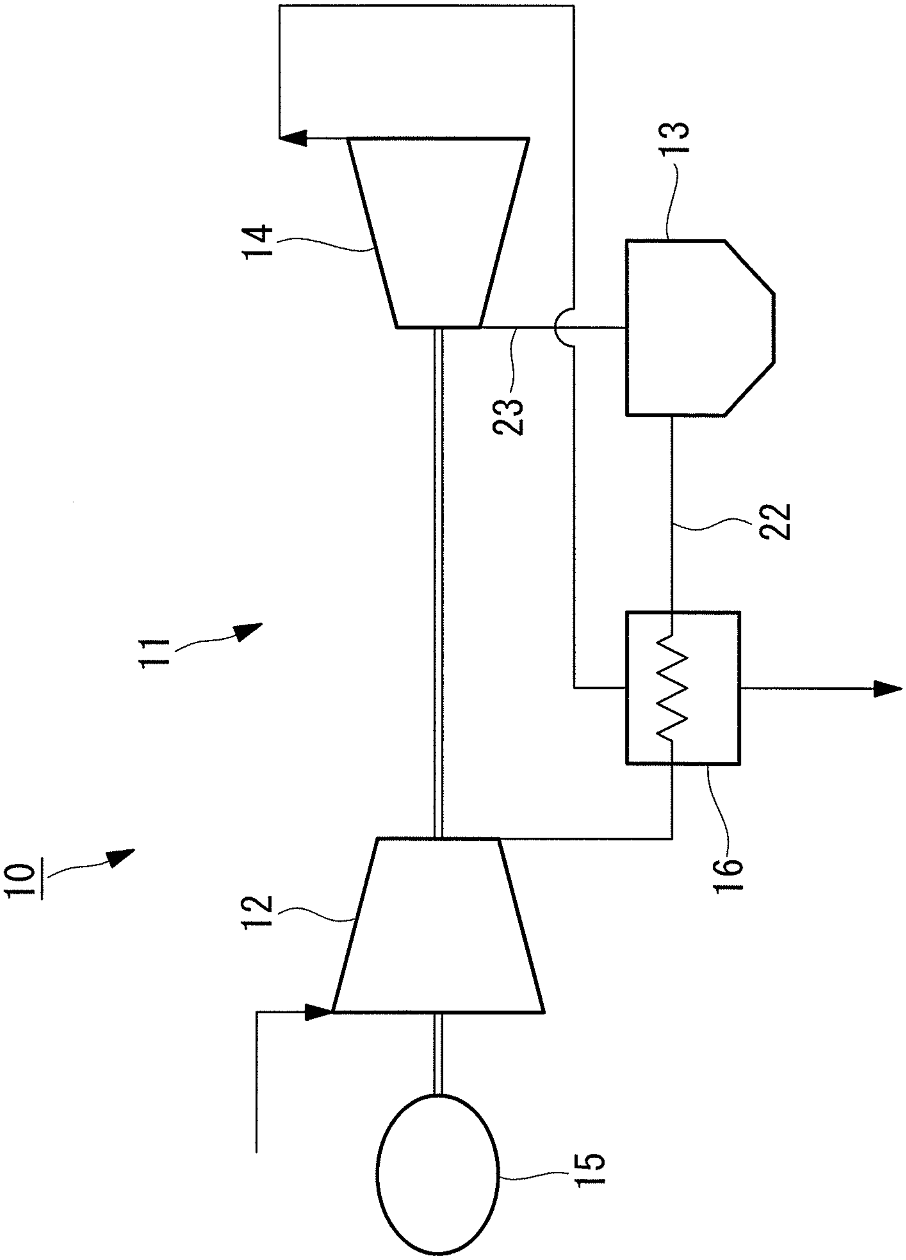
FIG. 1 is a schematic structural view showing a solar gas turbine and a solar-gas-turbine power generating device, having a solar receiver according to a first embodiment of the present invention.
Figure 2:
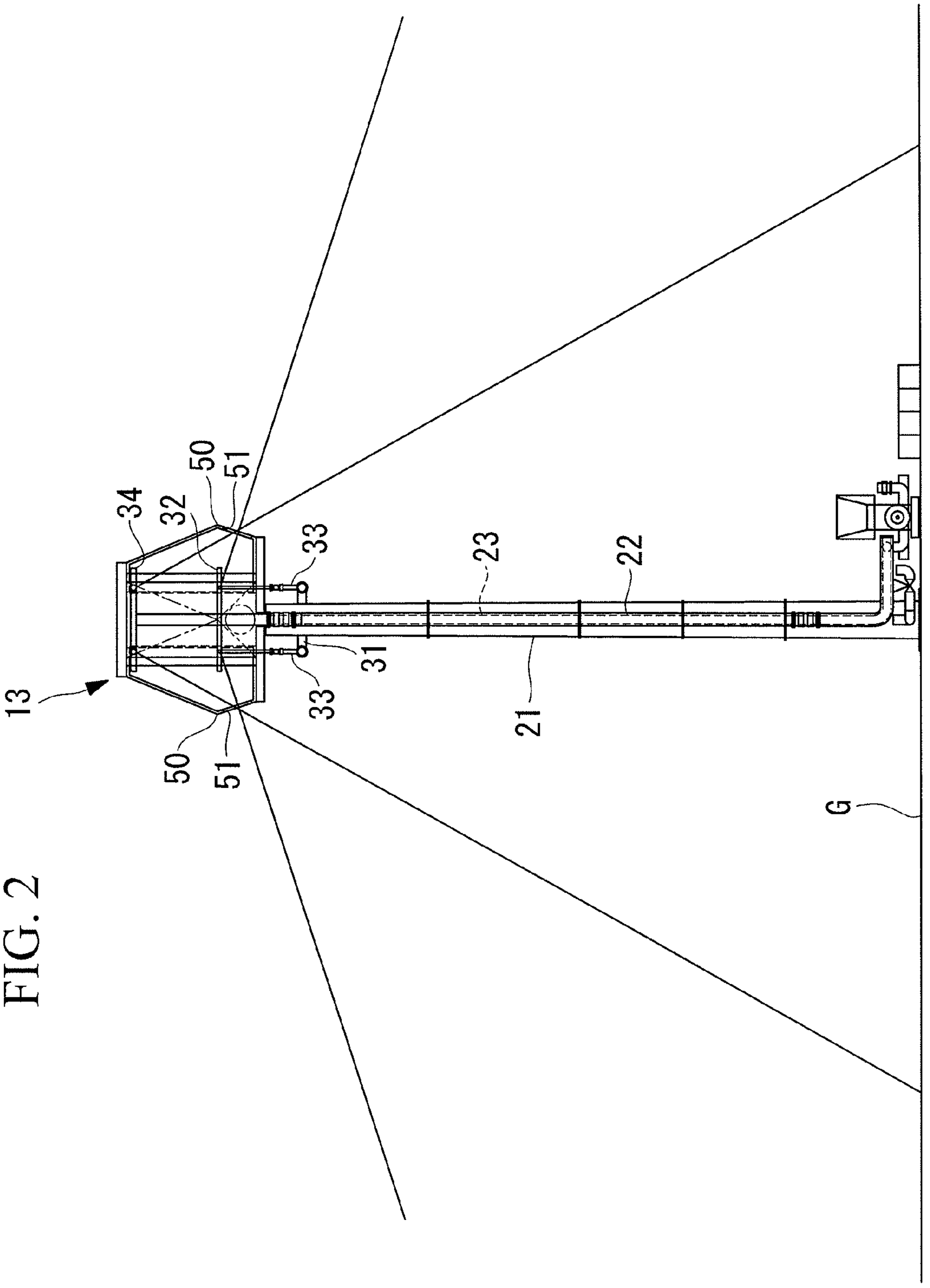
FIG. 2 is a view showing a tower on which the solar receiver according to the first embodiment of the present invention is mounted and the solar receiver from a lateral side and also showing part thereof in cross section.
Figure 3:
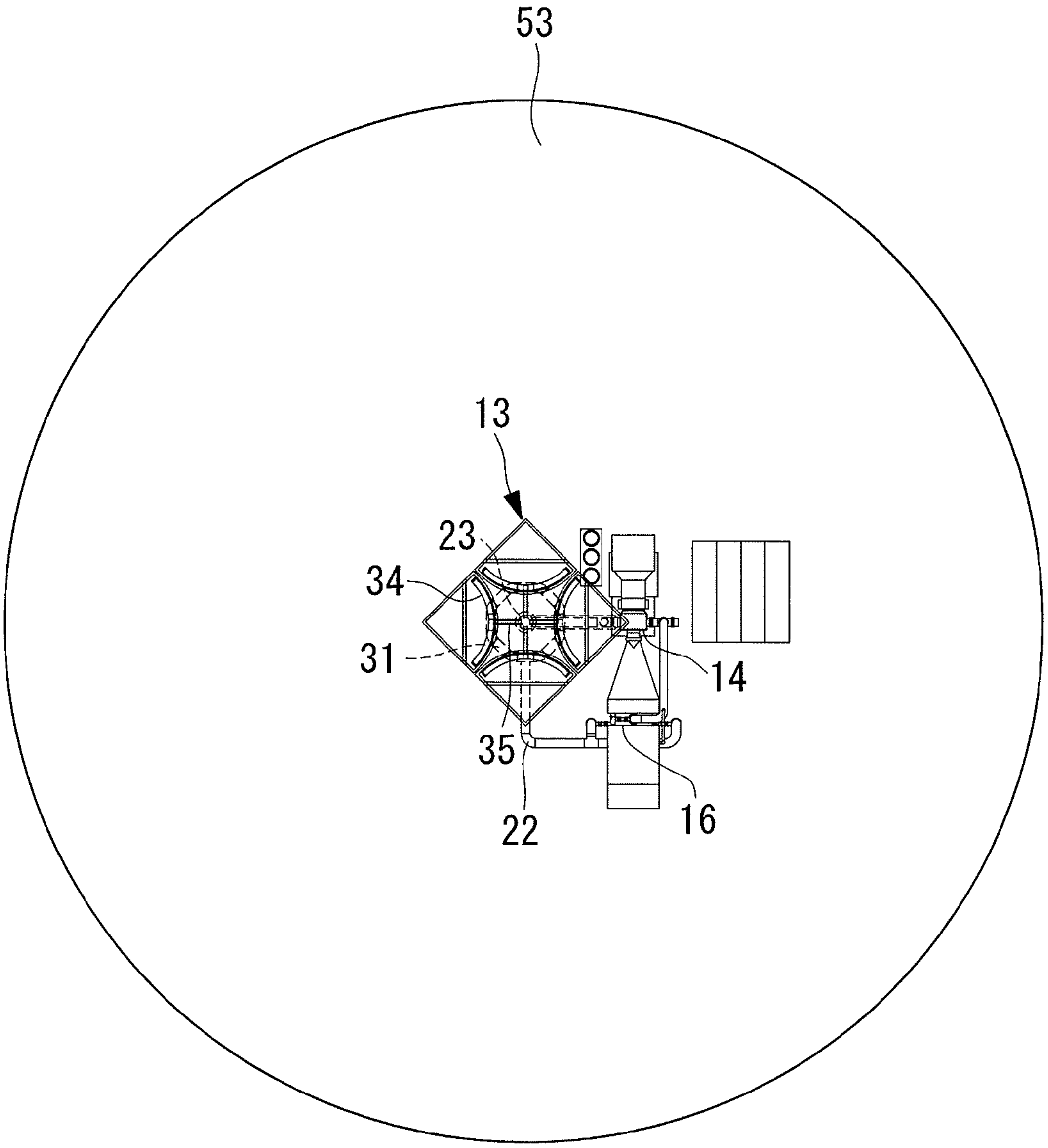
FIG. 3 is a view showing the tower on which the solar receiver according to the first embodiment of the present invention is mounted and the solar receiver from above and also showing part thereof in cross section.
Figure 4:
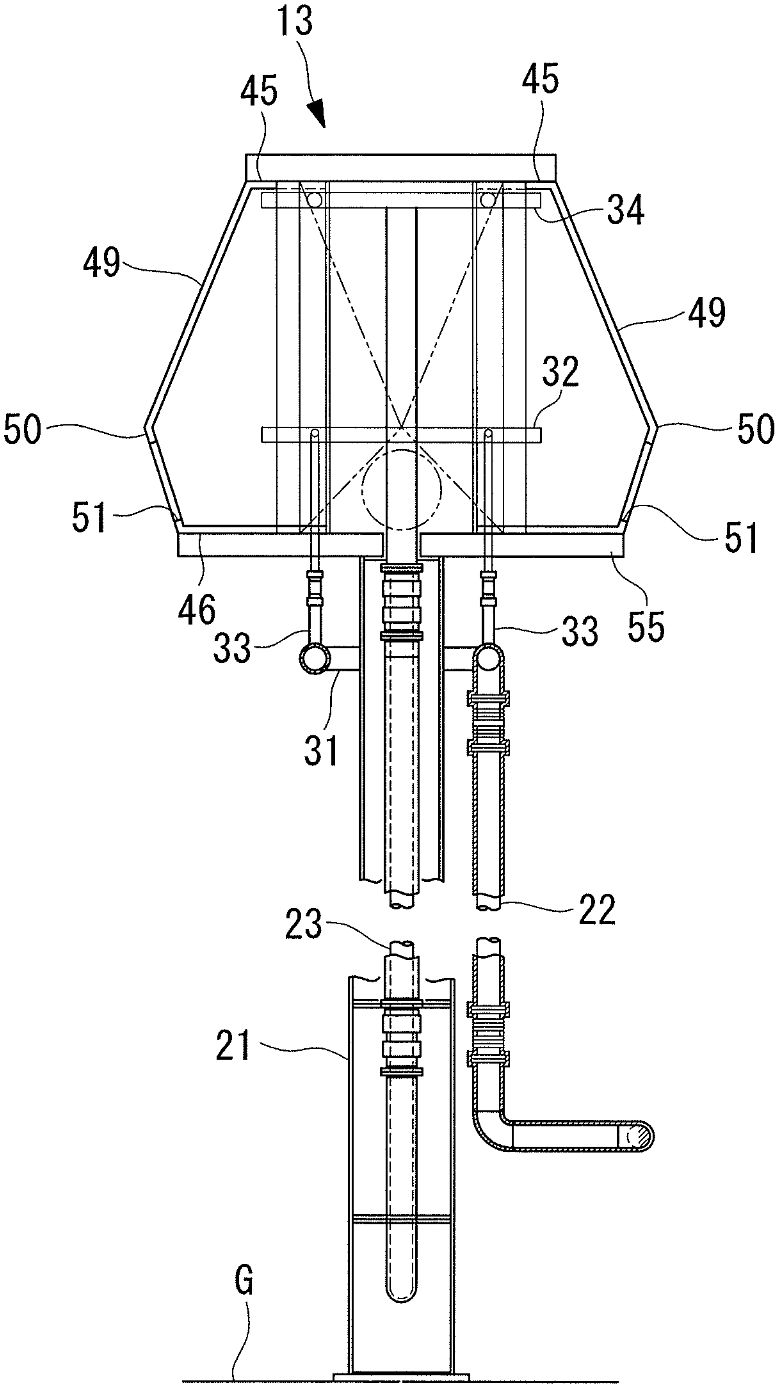
FIG. 4 is a view showing the tower on which the solar receiver according to the first embodiment of the present invention is mounted and the solar receiver from the left side of FIG. 2 and FIG. 3 and also showing part thereof in cross section.
Figure 5:
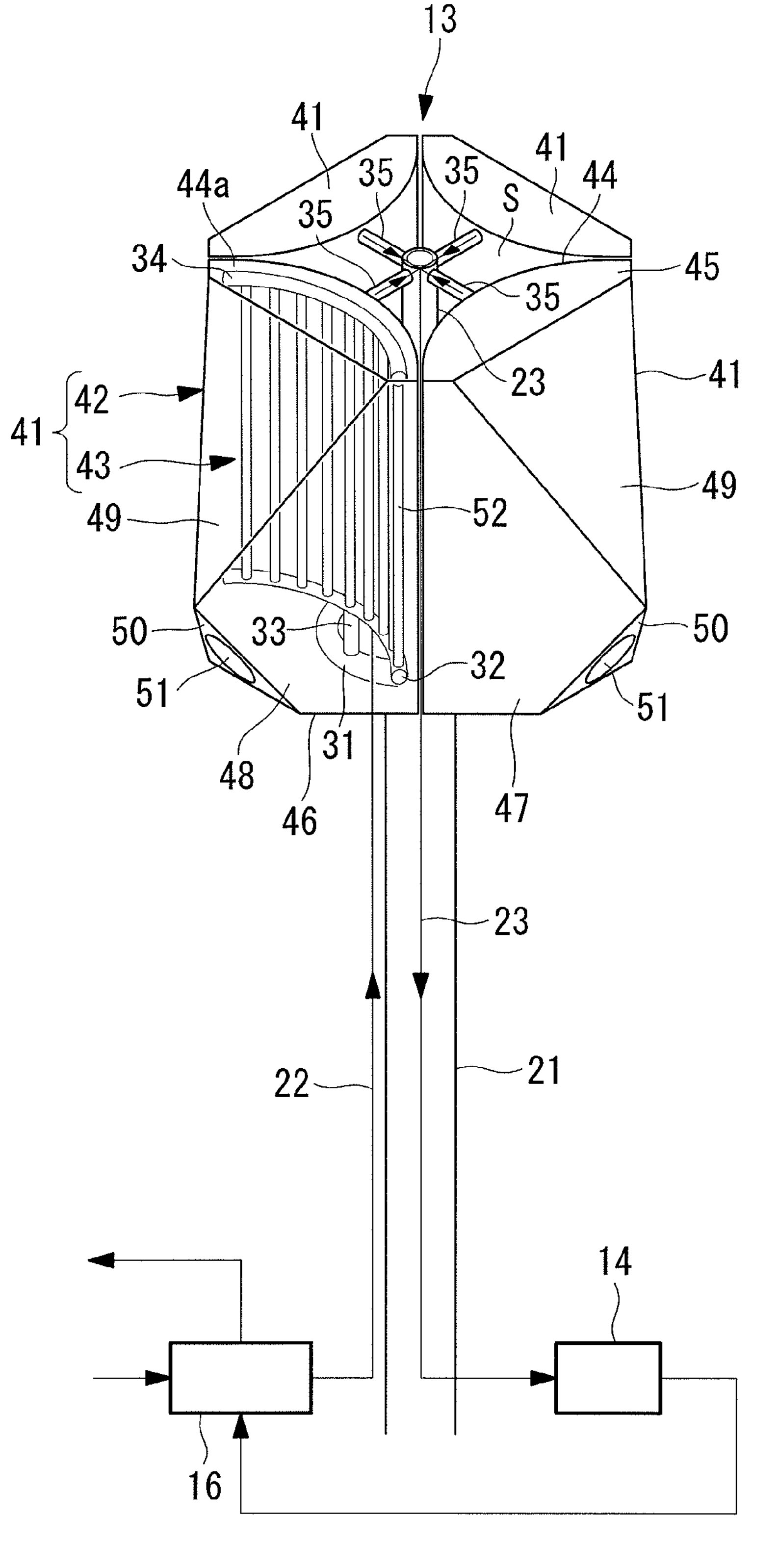
FIG. 5 is a view showing the tower on which the solar receiver according to the first embodiment of the present invention is mounted and the solar receiver obliquely from the upper side and also showing part of the interior of the solar receiver.

FIG. 1 is a schematic structural view showing a solar gas turbine and a solar-gas-turbine power generating device, having the solar receiver according to this embodiment. FIG. 2 is a view showing a tower on which the solar receiver according to this embodiment is mounted and the solar receiver from a lateral side and also showing part thereof in cross section. FIG. 3 is a view showing the tower, on which the solar receiver according to this embodiment is mounted, and the solar receiver from above and also showing part thereof in cross section. FIG. 4 is a view showing the tower, on which the solar receiver according to this embodiment is mounted, and the solar receiver from the left side of FIGS. 2 and 3 and also showing part thereof in cross section. FIG. 5 is a view showing the tower, on which the solar receiver according to this embodiment is mounted, and the solar receiver obliquely from the upper side and also showing part of the interior of the solar receiver.

As shown in FIG. 1, a solar gas turbine 11 is an apparatus that includes, as main components, a compressor 12 that compresses a compressible working fluid (for example, air), thus raising the pressure thereof; a solar receiver 13 that heats the compressible working fluid by means of heat converted from sunlight, thus raising the temperature thereof; and a turbine 14 that converts the heat energy of the high-temperature, high-pressure compressible working fluid into mechanical energy. Specifically, the solar gas turbine 11 has the solar receiver 13, which heats the compressible working fluid to raise the temperature thereof by using the heat energy of sunlight, instead of a combustor that produces high-temperature, high-pressure combustion gas by combusting fuel, such as natural gas.

Furthermore, a solar-gas-turbine power generating device 10 that generates power by using sunlight is obtained when a generator 15 is concentrically coupled to the solar gas turbine 11 such that the generator 15 is driven by the solar gas turbine 11.

Note that reference numeral 16 in the figure indicates a reheater that preheats a high-pressure compressible working fluid whose pressure has been raised by the compressor 12, by using the exhaust heat of a compressible working fluid that has been used in the turbine 14 and then discharged from a chimney (not shown) to the atmosphere.

The solar receiver 13 is a device used to convert sunlight into heat energy. As shown in FIGS. 2 and 4, the solar receiver 13 is disposed at the top of a tower 21 (for example, at the tip of the tower 21 of 100 meters high) provided upright on a ground G.

A first pipe 22 that guides, to the solar receiver 13, the compressible working fluid that has passed through the reheater 16 extends outside the tower 21 along the vertical direction. A second pipe 23 that guides, to the turbine 14 provided on the ground G, the compressible working fluid that has been heated and raised in temperature by the solar receiver 13 extends (is accommodated) inside the tower 21 along the vertical direction.

One end of the first pipe 22 is connected to the outlet of the reheater 16, and the other end (upper end) of the first pipe 22 is connected to the lower surface of a single branch pipe 31 that is disposed in a circle around the outer periphery of the tower 21. The bottom-face center portion of each inlet header 32 and the upper surface of the branch pipe 31, located vertically below the inlet header 32, are connected to each other via a single branch pipe 33 that is provided upright on the upper surface of the branch pipe 31 and that extends vertically upward.

One end of the second pipe 23 is connected to the inlet of the turbine 14. The other end (upper end) of the second pipe 23 is connected to one end (inner end) of each branch pipe 35 that extends inward along the horizontal direction. The other end (outer end) of the branch pipe 35 is connected to the back-face center portion of each outlet header 34.

As shown in FIG. 3 or FIG. 5, the solar receiver 13 is structured such that, when viewed from above, four parts obtained by equally dividing a circle are disposed back-to-back; specifically, four modules 41 having the same shape are disposed back-to-back.

Each of the modules 41 has a casing 42 and a heat-transfer-tube unit 43 accommodated in the casing 42.

The casing 42 has a back plate 44 whose inner periphery **44*a* serves as a heat receiving surface, a top plate 45 that is connected to the upper end of the back plate 44, a bottom plate 46 that is connected to the lower end of the back plate 44, a left-side plate 47 that is connected to the left end of the back plate 44, and a right-side plate 48 that is connected to the right end of the back plate 44**.

The back plate 44 is a plate-like member having a rectangular shape in plan view and is curved such that the left end and the right end thereof come close to each other, and such that the upper end and the lower end thereof have the same curvature from the left end to the right end (so as to be located on an arc drawn with the same radius, in this embodiment).

The top plate 45 is a plate-like member having a substantially semicircular shape in plan view (a substantially crescent shape in plan view), in which the outer circumferential end (inner end) thereof curved so as to have the same curvature from the left end to the right end (so as to be located on an arc drawn with the same radius R, in this embodiment) is connected to the upper end of the back plate 44.

The left-side plate 47 is a plate-like member having a substantially home base shape in plan view, in which the outer circumferential end (inner end) thereof is connected to the left end of the back plate 44, the upper end thereof is connected to the left end of the top plate 45, and the lower end thereof is connected to the left end of the bottom plate 46.

The right-side plate 48 is a plate-like member having a substantially home base shape in plan view, in which the outer circumferential end (inner end) thereof is connected to the right end of the back plate 44, the upper end thereof is connected to the right end of the top plate 45, and the lower end thereof is connected to the right end of the bottom plate 46.

Note that, as shown in FIG. 5, the left-side plate 47 and the right-side plate 48 are formed so as to have symmetrical shapes; specifically, the shape of the left-side plate 47 viewed from one side is the same as the shape of the right-side plate 48 viewed from the other side.

The bottom plate 46 is a plate-like member having a substantially semicircular shape in plan view, in which the outer circumferential end (inner end) thereof curved so as to have the same curvature from the left end to the right end (so as to be located on an arc drawn with the same radius R, in this embodiment) is connected to the lower end of the back plate 44, the left end thereof is connected to the lower end of the left-side plate 47, and the right end thereof is connected to the lower end of the right-side plate 48.

An opening formed by the outer end of the top plate 45, an outer end of the left-side plate 47 that is located at an upper side, and an outer end of the right-side plate 48 that is located at an upper side is sealed (covered up) with an upper plate (upper lid plate) 49 that has a (substantially) equilateral triangular shape in plan view and that constitutes (forms) the casing 42 together with the back plate 44, the top plate 45, the bottom plate 46, the left-side plate 47, and the right-side plate 48.

An opening formed by the outer end of the bottom plate 46, an outer end of the left-side plate 47 that is located at a lower side, and an outer end of the right-side plate 48 that is located at a lower side is sealed (covered up) with a lower plate (lower lid plate: plate-like member) 50 that has a (substantially) equilateral triangular shape in plan view and that constitutes (forms) the casing 42 together with the back plate 44, the top plate 45, the bottom plate 46, the left-side plate 47, and the right-side plate 48.

Furthermore, a sunlight inlet port 51 having a circular shape in front view (or an elliptical shape in front view) is provided (formed) at a center portion of the lower plate 50.

Furthermore, a heat insulating material (not shown) is filled (accommodated) in a space S (see FIG. 5) formed by the four back plates 44, where the other end (upper end) of the second pipe 23 is accommodated.

The heat-transfer-tube unit 43 includes the inlet header 32 disposed at a lower portion in the casing 42 along the inner periphery **44*a* of the back plate 44 and the horizontal plane; the outlet header 34 disposed at a higher portion in the casing 42 along the inner periphery 44*a* of the back plate 44 and the horizontal plane; and a plurality of (for example, 500) heat transfer tubes (pipes) 52 arrayed along the vertical direction at (substantially) regular intervals (such that the distances between the central axes extending along the longitudinal direction of adjacent heat transfer tubes 52 become (substantially) equal), one end (lower end) of each of the heat transfer tubes (pipes) 52 being connected to the upper surface of the inlet header 32, and the other end (upper end) thereof being connected to the lower surface of the outlet header 34**.

Note that only nine heat transfer tubes 52 are shown in FIG. 5, for the sake of simplification of the figure.

Furthermore, the heat transfer tubes 52 according to this embodiment are arrayed such that the interspace between adjacent heat transfer tubes 52 is (substantially) equal to the outer diameter of each heat transfer tube 52. Thus, solar heat passes through the interspace between the adjacent heat transfer tubes 52, a backside heat insulating material (not shown) that is disposed at the back sides of the heat transfer tubes 52 is heated by the solar heat passing through the interspace, and the back sides of the heat transfer tubes 52 are heated by radiation heat from the backside heat insulating material (not shown), thus reducing the temperature difference between the front sides and the back sides of the heat transfer tubes 52.

As shown in FIG. 3, a mirror-placement surface 53 having, for example, a circular shape in plan view is set on the ground G. A plurality of (for example, 400) heliostats (not shown) that efficiently reflect sunlight toward the inner periphery **44*a* (see FIG. 5) set inside the solar receiver 13 are disposed on the mirror-placement surface 53. As shown in FIG. 2, sunlight (not shown) collected (reflected) by the heliostats enters the interior of the solar receiver 13 via the sunlight inlet port 51, provided at the center portion of each lower plate 50 (see FIG. 5) constituting the solar receiver 13, and reaches the plurality of heat transfer tubes 52 (see FIG. 5), arrayed along the inner periphery 44***a* at (substantially) regular intervals, thus heating a high-pressure compressible working fluid passing through the heat transfer tubes 52 to raise the temperature thereof.

Furthermore, as shown in FIG. 4, the solar receiver 13 is fixed to the top surface (top-portion upper surface) of the tower 21 via a base (flange) 55 whose upper surface is brought into contact with the entire lower surface of the bottom plate 46 and that extends outward along the horizontal direction.

According to the solar receiver 13 of this embodiment, since the bottom plate 46, constituting the casing 42, is directly fixed to the top-portion upper surface of the tower 21, column supports 102 that were conventionally needed to install a solar receiver 103 at the top portion of a tower 100 are unnecessary.

Thus, it is possible to avoid a situation in which column supports for supporting the solar receiver 13 are disposed in the paths of sunlight from the heliostats to the sunlight inlet ports 51 of the solar receiver 13 and to achieve simplification of the supporting structure for supporting the solar receiver 13 and a reduction in the manufacturing cost thereof.

Furthermore, since each sunlight inlet port 51 is formed so as to have a circular shape in front view (or an elliptical shape in front view), it is possible to minimize the amount of heat leaking from the interior of the casing 42 to the exterior of the casing 42 via the sunlight inlet port 51, to maintain the interior of the casing 42 at a high temperature, and to efficiently heat the compressible working fluid flowing through the heat transfer tubes 52, thus raising the temperature thereof.

Furthermore, according to the solar receiver 13 of this embodiment, the interior of the space S, formed in a central portion between the casings 42 extending along the vertical direction, functions as hot banking, and the second pipe 23, which guides, to the turbine 14, the compressible working fluid flowing out from the heat transfer tubes 52, is disposed so as to pass through this hot banking.

Thus, it is possible to maintain the compressible working fluid passing through the second pipe 23 at a high temperature or to further heat the compressible working fluid passing through the second pipe 23 to raise the temperature thereof; and to improve the energy conversion efficiency.

Second Embodiment

A solar receiver according to a second embodiment of the present invention will be described.

The solar receiver according to this embodiment differs from that of the above-described first embodiment in that a heat insulating material that is thinner than the heat insulating material described in the first embodiment is filled (accommodated) in the space S, which is described in the first embodiment. Since the other components are the same as those of the above-described first embodiment, a description of those components will be omitted here.

In this embodiment, the heat insulating material thinner than the heat insulating material described in the first embodiment is filled in the space S (see FIG. 5) formed by the four back plates 44; for example, if the heat insulating material described in the first embodiment has a thickness of 300 mm, in this embodiment, heat insulating material having a thickness of 220 mm, thinner than the heat insulating material described in the first embodiment, is filled in the space S.

According to the solar receiver of this embodiment, since the heat insulating material thinner than the heat insulating material described in the first embodiment is filled in the space S, the weight of the solar receiver can be reduced.

Furthermore, when the size of the space S in the horizontal direction is reduced corresponding to the reduction in the thickness of the heat insulating material, it is possible to achieve a reduction in the size of the solar receiver and also to achieve a further reduction in the weight thereof.

Furthermore, since the temperature in the space S is increased corresponding to the reduction in the thickness of the heat insulating material, it is possible to maintain the compressible working fluid passing through the second pipe 23 at a higher temperature or to further heat the compressible working fluid passing through the second pipe 23 to raise the temperature thereof; and to further improve the energy conversion efficiency.

Since the other functional effects are the same as those of the above-described first embodiment, a description thereof will be omitted here.

Third Embodiment

Figure 6:
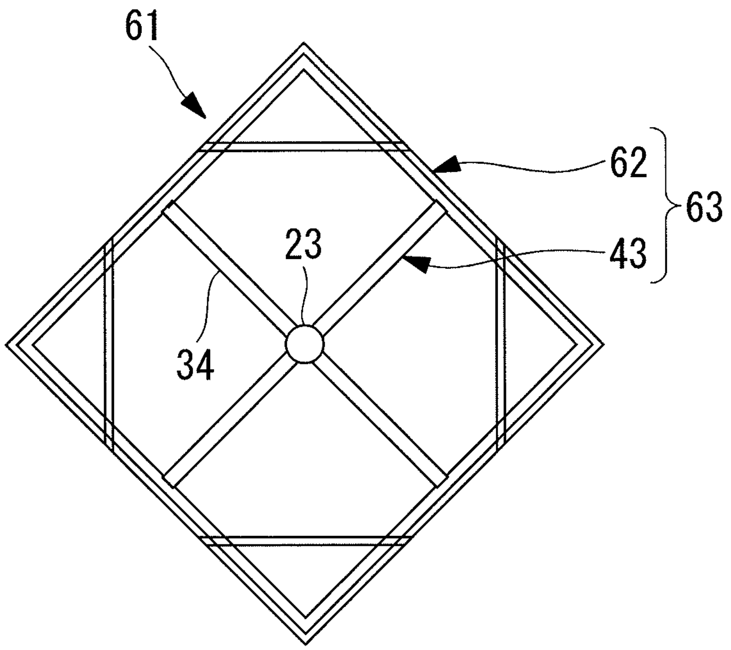
FIG. 6 is a view showing a solar receiver according to a third embodiment of the present invention from above and also showing part thereof in cross section.

A solar receiver according to a third embodiment of the present invention will be described with reference to FIG. 6. FIG. 6 is a view showing the solar receiver according to this embodiment from above and also showing part thereof in cross section.

As shown in FIG. 6, a solar receiver 61 according to this embodiment differs from those of the above-described embodiments in that the four back plates 44 and the heat insulating material (not shown) are not provided, a single top plate (not shown) is provided instead of the four top plates 45, a single bottom plate (not shown) is provided instead of the four bottom plates 46, the inlet headers 32 are disposed so as to have a cross shape when viewed from above, and the outlet headers 34 are disposed so as to have a cross shape when viewed from above. Specifically, the solar receiver 61 according to this embodiment is structured as a single module 63 that includes a single casing 62 and the four heat-transfer-tube units 43 accommodated in the casing 62.

Note that, since the other components are the same as those of the above-described embodiments, a description of those components will be omitted here.

Furthermore, with the outlet headers 34 being disposed so as to have a cross shape when viewed from above, one end (inner end) of each outlet header 34 is directly connected to the outer periphery of the second pipe 23, thereby eliminating the four branch pipes 35.

Furthermore, in this embodiment, since the back plates 44, whose inner peripheries 44*a* serve as the heat receiving surfaces, are not provided, the heat transfer tubes (pipes) 52 are arrayed with no (with a very slight) interspace between adjacent heat transfer tubes (pipes) 52.

According to the solar receiver 61 of this embodiment, since the four back plates 44, the space S, formed by the four back plates 44, and the heat insulating material (not shown) are not provided, it is possible to achieve a reduction in the size of the solar receiver 61 in the horizontal direction and also to achieve a further reduction in the weight thereof.

Furthermore, according to the solar receiver 61 of this embodiment, since the bottom plate 46, constituting the casing 42, is directly fixed to the top-portion upper surface of the tower 21, the column supports 102, which were conventionally needed to install the solar receiver 103 at the top portion of the tower 100, are unnecessary.

Thus, it is possible to avoid a situation in which column supports for supporting the solar receiver 61 are disposed in the paths of sunlight from the heliostats to the sunlight inlet ports 51 of the solar receiver 61 and to achieve simplification of the supporting structure for supporting the solar receiver 61 and a reduction in the manufacturing cost thereof.

Furthermore, since each sunlight inlet port 51 is formed so as to have a circular shape in front view (or an elliptical shape in front view), it is possible to minimize the amount of heat leaking from the interior of the casing 62 to the exterior of the casing 62 via the sunlight inlet port 51, to maintain the interior of the casing 62 at a high temperature, and to efficiently heat the compressible working fluid flowing through the heat transfer tubes 52 to raise the temperature thereof.

Fourth Embodiment

Figure 7:
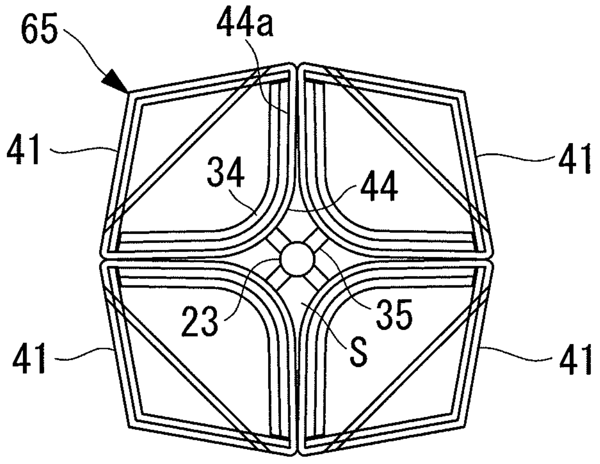
FIG. 7 is a view showing a solar receiver according to a fourth embodiment of the present invention from above and also showing part thereof in cross section.

A solar receiver according to a fourth embodiment of the present invention will be described with reference to FIG. 7. FIG. 7 is a view showing the solar receiver according to this embodiment from above and also showing part thereof in cross section.

As shown in FIG. 7, a solar receiver 65 according to this embodiment differs from those of the above-described embodiments in that the upper end and the lower end of each back plate 44 are curved so as to be located on an arc drawn with a hyperbolic line. Since the other components are the same as those of the above-described embodiments, a description of those components will be omitted here.

Furthermore, in this embodiment, corresponding to the change in shape of the back plate 44, the shapes of the top plate 45, the bottom plate 46, the left-side plate 47, the right-side plate 48, the upper plate 49, and the lower plate 50 are appropriately changed as needed.

Furthermore, each inlet header 32 and each outlet header 34 are curved along the inner periphery 44*a* of the back plate 44.

According to the solar receiver 65 of this embodiment, since the upper end and the lower end of each back plate 44 are curved so as to be located on the arc drawn with the hyperbolic line, and the inlet header 32 and the outlet header 34 are curved along the inner periphery 44*a* of the back plate 44, it is possible to achieve a reduction in the size of the solar receiver 65 in the horizontal direction.

Since the other functional effects are the same as those of the above-described first embodiment, a description thereof will be omitted here.

Furthermore, according to the solar gas turbine 11 of the present invention, the solar receiver is provided, which is capable of avoiding a situation in which column supports for supporting the solar receiver are disposed in the paths of sunlight from the heliostats (not shown) to the sunlight inlet ports 51 of the solar receiver and which is capable of achieving simplification of the supporting structure for supporting the solar receiver and a reduction in the manufacturing cost thereof; therefore, it is possible to achieve simplification of the supporting structure at the top portion of the tower 21 and a reduction in the installation cost thereof.

Furthermore, the solar receiver is provided, which is capable of minimizing the amount of heat leaking from the interior of the casing to the exterior of the casing via each sunlight inlet port 51 because the sunlight inlet port 51 is formed so as to have a circular shape in front view or an elliptical shape in front view, which is capable of maintaining the interior of the casing at a high temperature, and which is capable of efficiently heating the compressible working fluid flowing through the heat transfer tubes 52 to raise the temperature thereof; therefore, it is possible to improve the energy conversion efficiency and to improve the overall heat efficiency.

Furthermore, according to the solar-gas-turbine power generating device 10 of the present invention, the solar receiver is provided, which is capable of avoiding a situation in which column supports for supporting the solar receiver are disposed in the paths of sunlight from the heliostats to the sunlight inlet ports 51 of the solar receiver and which is capable of achieving simplification of the supporting structure for supporting the solar receiver and a reduction in the manufacturing cost thereof; therefore, it is possible to achieve simplification of the supporting structure at the top portion of the tower 21 and a reduction in the installation cost thereof.

Furthermore, the solar receiver is provided, which is capable of minimizing the amount of heat leaking from the interior of the casing to the exterior of the casing via each sunlight inlet port 51 because the sunlight inlet port 51 is formed so as to have a circular shape in front view or an elliptical shape in front view, which is capable of maintaining the interior of the casing at a high temperature, and which is capable of efficiently heating the compressible working fluid flowing through the heat transfer tubes 52 to raise the temperature thereof; therefore, it is possible to improve the energy conversion efficiency and to improve the power generation efficiency.

Note that the present invention is not limited to the above-described embodiments, but appropriate modifications and changes can be made as needed.

Figure 8:
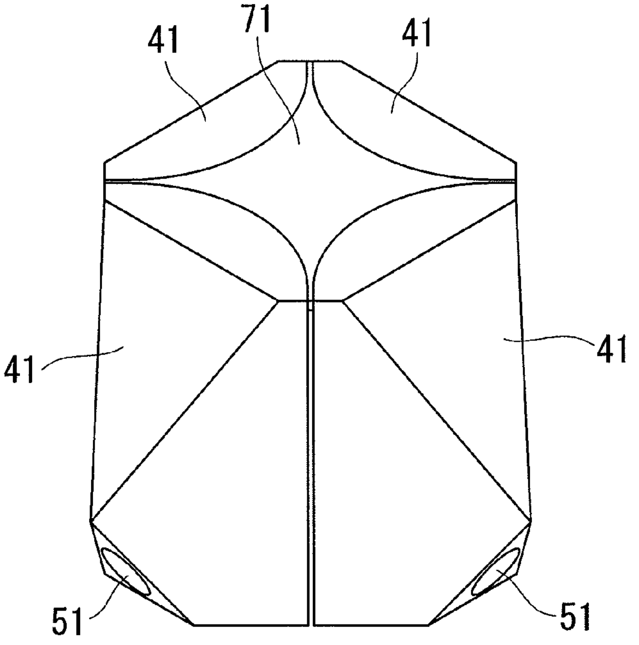
FIG. 8 is a perspective view showing a solar receiver according to another embodiment of the present invention obliquely from the upper side.

For example, as shown in FIG. 8, a lid member 71 may be provided for an opening formed above the space S (see FIG. 5) of the above-described embodiments to seal (cover) the opening, formed above the space S.

Thus, it is possible to maintain the interior of the space S at a higher temperature; to maintain the compressible working fluid passing through the second pipe 23, accommodated in the space S, at a higher temperature, or to further heat the compressible working fluid passing through the second pipe 23 to raise the temperature thereof; and to further improve the energy conversion efficiency.

Figure 9:
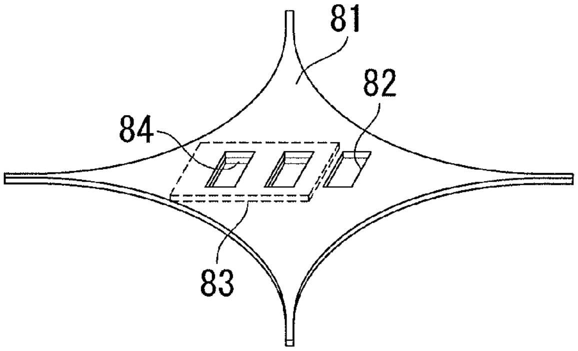
FIG. 9 is a perspective view showing a lid member of a solar receiver according to still another embodiment of the present invention obliquely from the upper side.

Furthermore, as shown in FIG. 9, a lid member 81 may be provided instead of the lid member 71.

At a center portion of the lid member 81, a plurality of (in this embodiment, three) vent holes 82 that each have a rectangular shape in plan view and that pass through the lid member 81 in the plate thickness direction are provided in line. An opening and closing plate 83 that moves along the lower surface of the lid member 81 in a direction in which the vent holes 82 are arrayed (in the horizontal direction in FIG. 9) to open or close the vent holes 82 is provided below the vent holes 82.

Note that through holes 84 that each have a rectangular shape in plan view and that pass through the opening and closing plate 83 in the plate thickness direction are provided (formed) in the opening and closing plate 83. The through holes 84 match the vent holes 82 in a fully open state, thus making the vent holes 82 completely open; the through holes 84 make the vent holes 82 half open (half covered) in a half-open state; and the through holes 84 completely close (completely cover) the vent holes 82 in a fully closed state. Specifically, when the vent holes 82 are opened, heat in the space S is released via the vent holes 82, thus reducing the temperature in the space S. Furthermore, when the vent holes 82 are closed, the opening formed above the space S is completely covered, thus increasing the temperature in the space S.

Thus, the temperature in the space S can be maintained within a predetermined temperature range.

Figure 10:
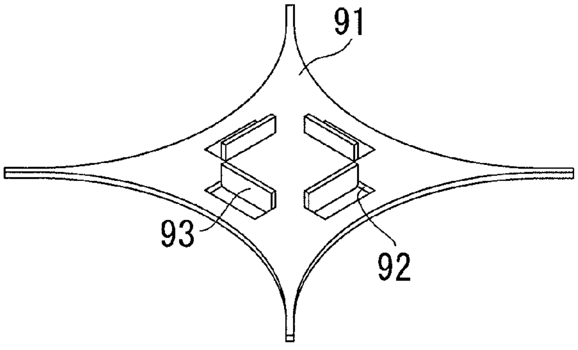
FIG. 10 is a perspective view showing a lid member of a solar receiver according to still another embodiment of the present invention obliquely from the upper side.
Figure 11:
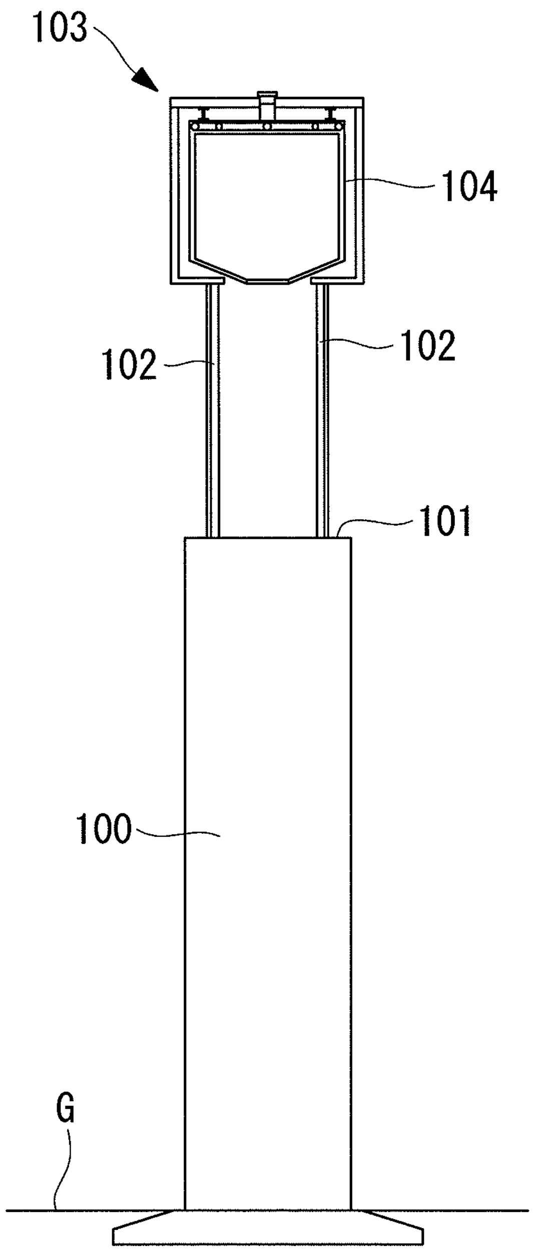
FIG. 11 is a view showing a tower on which a conventional solar receiver is mounted and the solar receiver from a lateral side.
Figure 12:
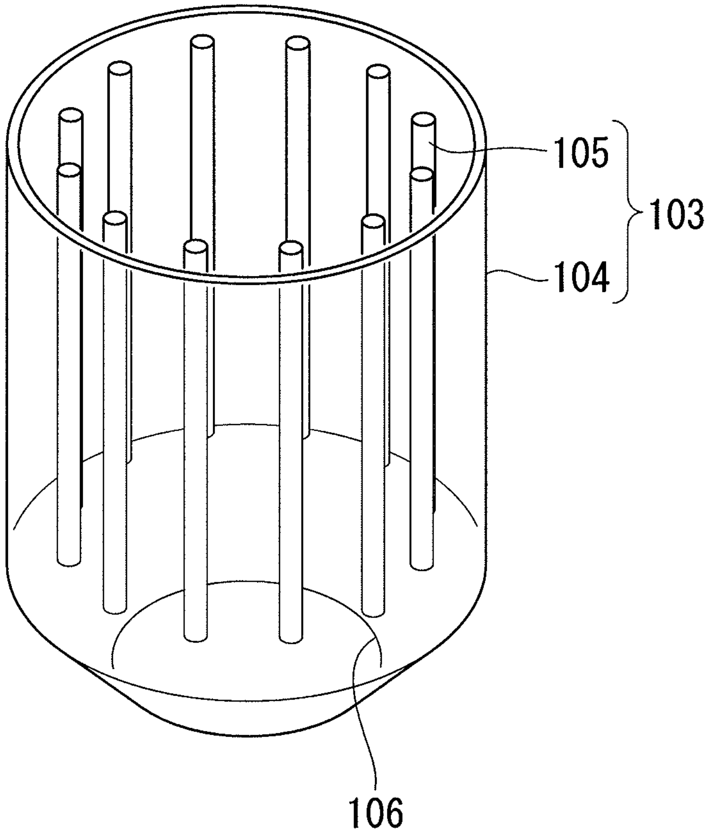
FIG. 12 is a perspective view showing the solar receiver shown in FIG. 11 obliquely from the upper side.

Furthermore, as shown in FIG. 10, a lid member 91 may be provided instead of the lid member 71.

At a center portion of the lid member 91, a plurality of (in this embodiment, four) vent holes 92 that each have a rectangular shape in plan view and that pass through the lid member 91 in the plate thickness direction are provided along the circumferential direction. Each of the vent holes 92 is provided with an opening and closing plate 93 that pivots about a pivot shaft (hinge) (not shown), thus opening or closing the corresponding vent hole 92. Specifically, when the vent holes 92 are opened, the heat in the space S is released via the vent holes 92, thus reducing the temperature in the space S. Furthermore, when the vent holes 92 are closed, the opening formed above the space S is completely covered, thus increasing the temperature in the space S.

Thus, the temperature in the space S can be maintained in a predetermined temperature range.

Furthermore, based on data (measurement value) output from a temperature sensor (not shown) for measuring the temperature in the space S to a controller (not shown), a control signal may be output from the controller to a driving source (not shown) for opening and closing the opening and closing plate 83 or 93, to control the degree of opening of the opening and closing plate 83 or 93.

Thus, the temperature in the space S can be automatically maintained in a predetermined temperature range.

Furthermore, in the above-described embodiments, a description has been given of a concrete example in which the solar receiver has a shape in which, when viewed from above, four parts obtained by equally dividing a circle are disposed back-to-back; however, the present invention is not limited thereto. The solar receiver may have a shape in which two parts obtained by equally dividing a circle, three parts obtained by equally dividing a circle, parts of a polygonal shape, five or more parts obtained by equally dividing a circle, or parts of a polygonal shape are disposed back-to-back.

What is claimed is:

1. A solar receiver that is disposed at a top portion of a tower provided upright on the ground and that is configured to heat a compressible working fluid by heat converted from sunlight collected by heliostats disposed on the ground, to raise the temperature of the compressible working fluid, the solar receiver comprising:
- a plurality of casings disposed back-to-back, each of the casings having
  - a bottom plate to be fixed to an upper surface of the top portion of the tower,
  - a back plate,
  - a plate member including a lower end connected to an outer circumferential end of the bottom plate to constitute the casing, wherein the plate member extends obliquely upward from the outer circumferential end of the bottom plate, and
  - a sunlight inlet port provided at a center portion of the plate member and having a circular shape in front view or an elliptical shape in front view;
- a heat-transfer-tube unit that is accommodated in each of the casings and that comprises heat transfer tubes to which the heat is to be transferred; and
- a pipe provided in a space surrounded by the back plates of the casings to guide the compressible working fluid flowing out from the heat transfer tubes to a turbine.

2. A solar receiver according to claim 1, wherein, when the heat-transfer-tube unit is viewed from above, the heat-transfer-tube unit has a shape of a line having the same curvature from a left end of the heat-transfer-tube unit to a right end thereof in a width direction of the heat-transfer-tube unit such that said line is convex toward the pipe.

3. A solar receiver according to claim 1, wherein, when the heat-transfer-tube unit is viewed from above, the heat-transfer-tube unit has a shape of a hyperbolic line from a left end of the heat-transfer-tube unit to a right end thereof in a width direction of the heat-transfer-tube unit such that said hyperbolic line is convex toward the pipe.

4. A solar receiver according to claim 1, further comprising a lid member for covering an upper portion of the space.

5. A solar receiver according to claim 2, further comprising a lid member for covering an upper portion of the space.

6. A solar receiver according to claim 3, further comprising a lid member for covering an upper portion of the space.

7. A solar receiver according to claim 4, wherein the lid member is provided with
- a vent hole that passes through the lid member in a thickness direction of the lid member, and
- an opening and closing plate configured to open and close the vent hole.

8. A solar receiver according to claim 5, wherein the lid member is provided with
- a vent hole that passes through the lid member in a thickness direction of the lid member, and
- an opening and closing plate configured to open and close the vent hole.

9. A solar receiver according to claim 6, wherein the lid member is provided with
- a vent hole that passes through the lid member in a thickness direction of the lid member, and
- an opening and closing plate configured to open and close the vent hole.

10. A solar receiver that is disposed at a top portion of a tower provided upright on the ground and that is configured to heat a compressible working fluid by heat converted from sunlight collected by heliostats disposed on the ground, to raise the temperature of the compressible working fluid, said solar receiver comprising:
- a casing having
  - a bottom plate to be fixed to an upper surface of the top portion of the tower,
  - a back plate extending in a vertical direction,
  - a plate member including a lower end connected to an outer circumferential end of the bottom plate to constitute the casing, wherein the plate member extends obliquely upward from the outer circumferential end of the bottom plate, and
  - a sunlight inlet port provided at a center portion of the plate member and having a circular shape in front view or an elliptical shape in front view;
- a heat-transfer-tube unit that is accommodated in the casing and that comprises heat transfer tubes to which the heat is to be transferred; and
- a pipe provided at a vicinity of the back plate for guiding the compressible working fluid flowing out from the heat transfer tubes to a turbine.

11. A solar receiver according to claim 10, further comprising a lid member for covering an upper portion of the space.

12. A solar receiver according to claim 11, wherein the lid member is provided with
- a vent hole that passes through the lid member in a thickness direction of the lid member, and
- an opening and closing plate configured to open and close the vent hole.

13. A solar gas turbine, comprising:
- a solar receiver according to claim 1; and
- heliostats disposed on the ground.

14. A solar gas turbine, comprising:

a solar receiver according to claim 10; and heliostats disposed on the ground.

15. A solar-gas-turbine power generating device, comprising a solar gas turbine according to claim 13.

16. A solar-gas-turbine power generating device, comprising a solar gas turbine according to claim 14.

* * * * *

UNITED STATES PATENT AND TRADEMARK OFFICE

CERTIFICATE OF CORRECTION

PATENT NO. : 9,032,730 B2
APPLICATION NO. : 13/302005
DATED : May 19, 2015
INVENTOR(S) : Kazuta Kobayashi et al.

It is certified that error appears in the above-identified patent and that said Letters Patent is hereby corrected as shown below:

On the title page, and in the specification, column 1, line 1, (54), the title should read as follows:

-- SOLAR RECEIVER --.

Signed and Sealed this
Twenty-ninth Day of September, 2015

*Michelle K. Lee*

Michelle K. Lee
*Director of the United States Patent and Trademark Office*